United States Patent [19]
Okuyama et al.

[11] Patent Number: 5,677,931
[45] Date of Patent: Oct. 14, 1997

[54] TRANSMISSION PATH SWITCHING APPARATUS

[75] Inventors: Keiichi Okuyama, Tokyo; Kunihiko Akama, Miyagi, both of Japan

[73] Assignee: NEC Corporation, Japan

[21] Appl. No.: 394,849

[22] Filed: Feb. 27, 1995

[51] Int. Cl.$^6$ ............................................. H04B 3/38
[52] U.S. Cl. ........................ 375/260; 370/227; 370/228; 340/825.01; 340/827; 371/68.2
[58] Field of Search ............................ 375/220, 259, 375/260, 267, 357, 372, 377; 370/16, 53, 54, 60, 94.1, 100.1, 105.1, 105.2; 379/16, 17, 221, 273; 340/827, 825.01; 371/49.1, 68.2; 395/182.04, 182.05, 182.08, 182.1, 184.01

[56] References Cited

U.S. PATENT DOCUMENTS 5,475,675  12/1995  Kondo et al. ............................ 370/16

FOREIGN PATENT DOCUMENTS

06188864 A  7/1994  Japan.

Primary Examiner—Stephen Chin
Assistant Examiner—Amanda T. Le
Attorney, Agent, or Firm—Ostrolenk, Faber, Gerb & Soffen, LLP

[57] ABSTRACT

Only when data inputted from first and second transmission paths agree with each other, a selector effects switching from the data from the first transmission path to the data from the second transmission path or from the data from the second transmission path to the data from the first transmission path. A transmission interface adds an overhead to the data of a payload outputted from the selector. A counter counts up at the timing of an overhead in the data inputted from the first transmission path based on an output signal from a multi-frame synchronizing circuit that is associated with the first transmission path. In the absence of uninterrupted data switching by the selector, a parity bit is inserted into a random pattern generated by a random pattern generator, and the random pattern with the inserted parity bit is written into a memory while the counter is counting up.

2 Claims, 4 Drawing Sheets

TRANSMISSION PATH SWITCHING APPARATUS

BACKGROUND OF THE INVENTION

1. Field of the Invention

The present invention relates to a digital data transmission apparatus, and more particularly to a transmission path switching apparatus for being supplied with data transmitted through two different transmission paths branched from a companion device, and selecting and outputting the data from one of the transmission paths.

2. Description of the Related Art

It has been customary in the field of digital data transmission to employ two transmission paths for making it possible to transmit data without interruption of services when repeaters, terminal equipments and so on in the transmission paths are serviced or repaired. Specifically, when one of the transmission paths is cannot be used for data transmission due to servicing or repair of a repeater in the transmission path, the other transmission path is used to transmit desired data, and the data transmitted through the other transmission path are selected and outputted by a transmission path switching apparatus.

FIG. 1 of the accompanying drawings shows in block form a conventional transmission path switching apparatus, and FIG. 2 of the accompanying drawings shows data inputted from transmission paths A, B and data to be written in elastic memories 9, 10.

The conventional transmission path switching apparatus shown in FIG. 1 has a pair of reception interfaces 1, 2, a pair of multiframe synchronizing circuits 3, 4, a pair of parity generators 5, 6, a pair of parity inserters 7, 8, a pair of elastic memories 9, 10, a pair of parity counters 11, 12, a pair of parity monitor units 13, 14, a pair of address counters 15, 16, a comparator 17, a selector 18, and a transmission interface 19.

Data transmitted over the transmission paths A, B that are branched from a companion device are received by the respective reception interfaces 1, 2. As shown in FIG. 2, the received data are of a multiframe composed of a plurality of frames each having 90 bytes×9 rows. One frame includes a payload which is a main signal and an overhead for monitoring an error of a transmission path and a synchronizing pattern. When the reception interfaces 1, 2 detect an overhead, they output frame pulses to the respective address counters 15, 16, and terminate the overhead. The multiframe synchronizing circuits 3, 4 detect starting positions of the data received by the reception interfaces 1, 2 from the positions of synchronizing patterns that are defined by one of the overheads. The payloads outputted from the reception interfaces 1, 2 are inputted respectively to the parity generators 5, 6, which check the number of 1s in the data of the payloads and generate parity bits. The parity inserters 7, 8 insert the generated parity bits into the data of the payloads, and write the data into the elastic memories 9, 10, respectively. The address counters 15, 16 generate writing addresses for the elastic memories 9, 10 based on output signals from the multiframe synchronizing circuits 3, 4 and reading addresses therefor based on the timing of the frame pulses so as to be positioned at the start of the data from the transmission paths A, B i.e., to make the phase difference between the data zero. The parity counters 11, 12 effect a parity check operation on data outputted from the elastic memories (ES) 9, 10. The parity monitor units 13, 14 monitor data errors based on the result of the parity check operation effected by the parity counters 11, 12. The comparator 17 detects whether the data outputted from the elastic memories 9, 10 agree with each other or not i.e., whether the phase difference between the data is zero or not. Only when an output signal from the comparator 17 indicates that the data outputted from the elastic memories 9, 10 agree with each other, the selector 18 carries out uninterrupted switching either from the data outputted from the elastic memory 9 to the data outputted from the elastic memory 10 or from the data outputted from the elastic memory 10 to the data outputted from the elastic memory 9. The transmission interface 19 adds the overhead outputted from the reception interface 1 or 2 to the data (payload) outputted from the selector 18, and outputs the payload with the added overhead to a transmission path.

In the conventional transmission path switching apparatus, the elastic memory associated with an auxiliary transmission path is used only upon uninterrupted data switching, and hence cannot monitor the data at all times. If the data were inputted to the elastic memory associated with an auxiliary transmission path at all times for monitoring the data, the elastic memory would consume an increased amount of electric energy.

SUMMARY OF THE INVENTION

It is an object of the present invention to provide a transmission path switching apparatus which allows data stored in the elastic memory associated with an auxiliary transmission path to be monitored without increasing the electric energy consumption by the elastic memory.

To achieve the above object, there is provided in accordance with the present invention a transmission path switching apparatus comprising first and second reception interface means for receiving multiframe data inputted respectively from first and second transmission paths and for outputting frame pulses each time the first and second reception interface means receive overheads in frames of the data, first and second multiframe synchronizing means for detecting starting positions of the received data from positions of synchronizing patterns contained in the overheads of the data received by the first and second reception interface means, random pattern generating means for generating a random pattern, first selector means for selecting either a payload in the data received by the second reception interface means or the random pattern generated by the random pattern generating means, first parity generating and inserting means for generating parity bits from a payload in the data received by said first reception interface means, and inserting the generated parity bits into said payload; second parity generating and inserting means for generating parity bits respectively from a payload in the data received by the second reception interface means and an output signal from the first selector means, and inserting the generated parity bits respectively into the payload and the output signal, first and second memories for storing output signals, respectively, from the first and second parity generating and inserting means, counter means for incrementing a count in response to a frame pulse outputted from the first reception interface means, second selector means for selecting either an output signal from the first multiframe synchronizing means or an output signal from the counter means, first and second address generating means for generating writing addresses for the first and second memories based on respective output signals from the first and second multiframe synchronizing means, and generating reading addresses for the first and second memories in timed relation to the frame pulses, parity monitor means for monitoring parity bits in data read from the first and second memories, comparator means for comparing the data read from the first and second memories to determine whether the data read from the first and second memories agree with each other or not, third selector means for selecting either the data read from the second memory instead of the data read from the first memory or the data read from the first memory instead of the data read from the second memory if the data read from the first and second memories do not agree with each other as determined by the comparator means, and transmission interface means for adding an overhead extracted by the first or second reception interface means to the data of a payload selected by the third selector means, the arrangement being such that when the third selector means effects uninterrupted data switching, the first and second selector means select an output signal from the second reception interface and the output signal from the second multiframe synchronizing means, respectively, and when the third selector means does not effect uninterrupted data switching, the first and second selector means select the random pattern from the random pattern generating means and the output signal from the counter means, respectively.

The above and other objects, features, and advantages of the present invention will become apparent from the following description when taken in conjunction with the accompanying drawings which illustrate a preferred embodiment of the present invention byway of example.

DETAILED DESCRIPTION OF THE PREFERRED EMBODIMENT

Figure 1:
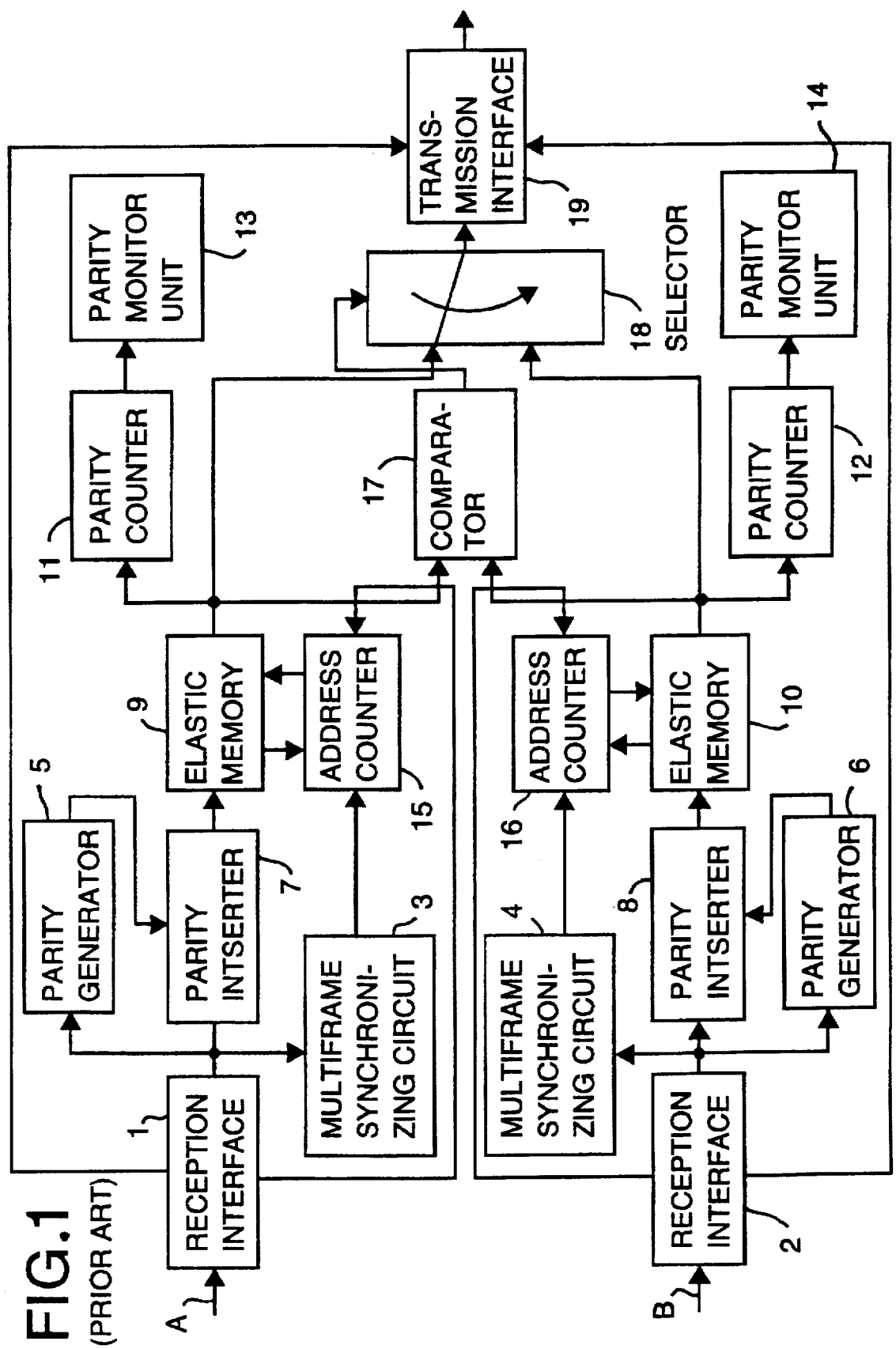
FIG. 1 is a block diagram of a conventional transmission path switching apparatus.
Figure 2:
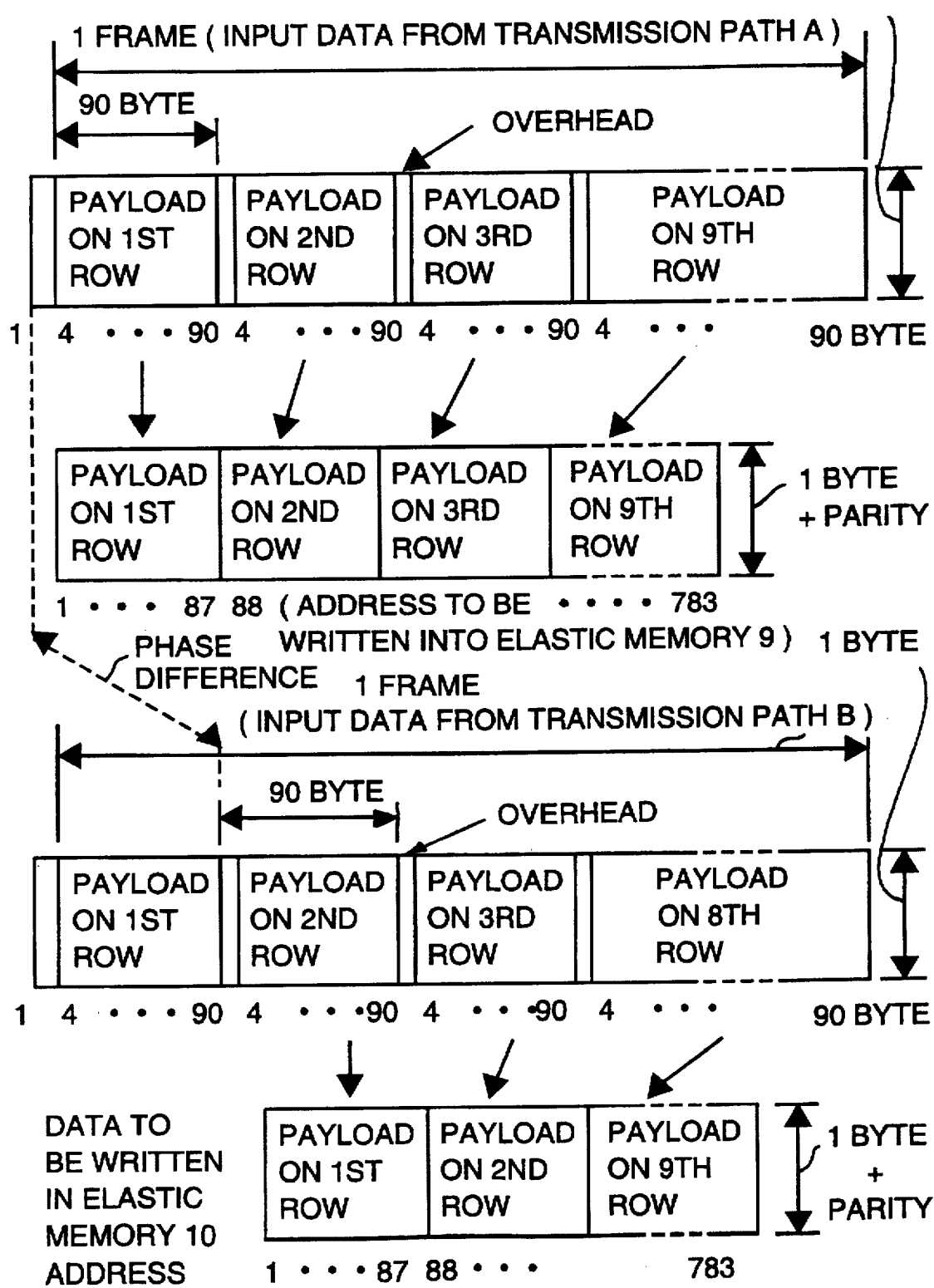
FIG. 2 is a diagram showing data inputted from transmission paths and data to be written in elastic memories in FIG. 1.
Figure 3:
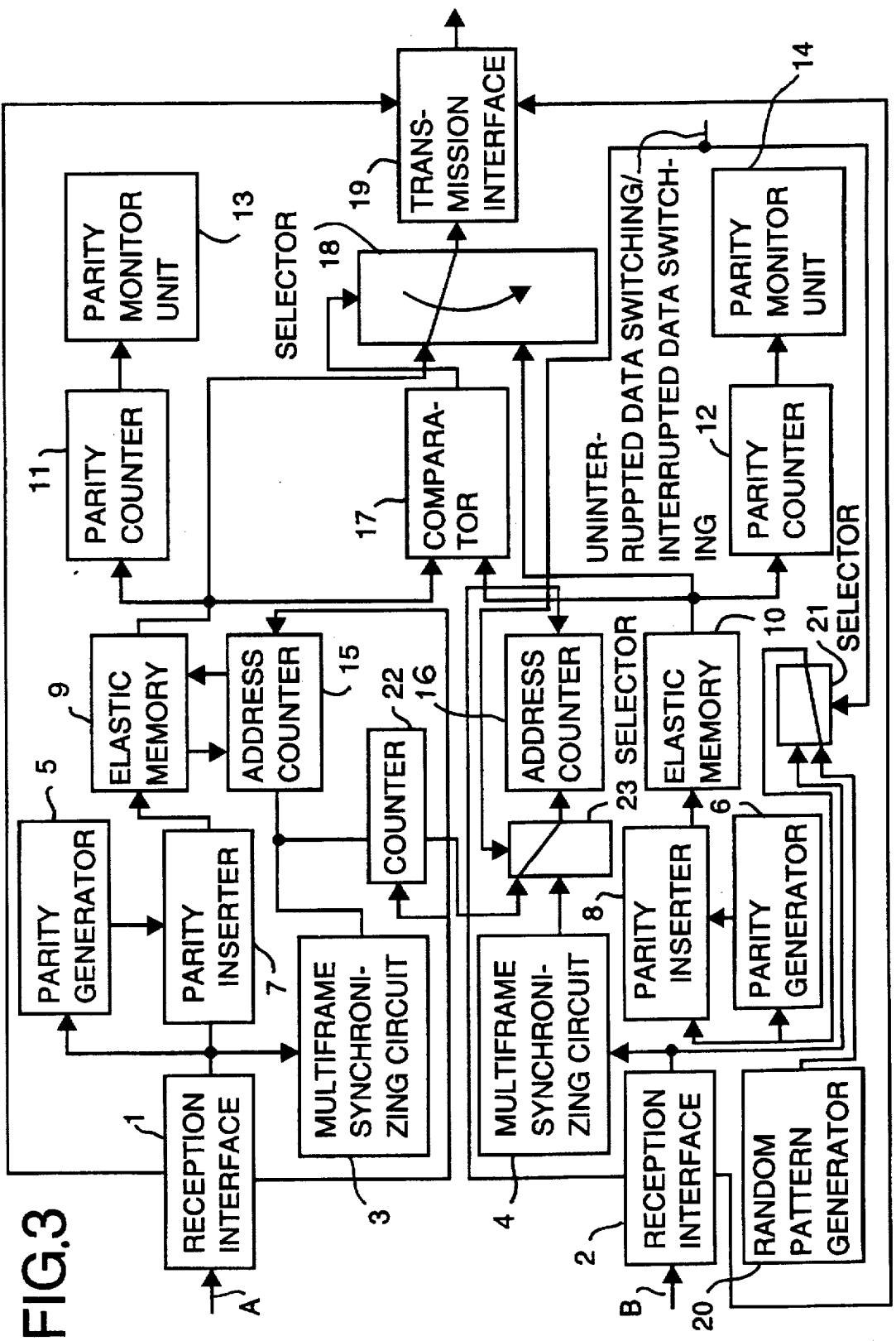
FIG. 3 is a block diagram of a transmission path switching apparatus according to the present invention.

As shown in FIG. 3, a transmission path switching apparatus according to the present invention comprises an arrangement identical to that of the conventional transmission path switching apparatus shown in FIG. 1, a random pattern generator 20, a pair of selectors 21, 23, and a counter 22. Those parts of the transmission path switching apparatus shown in FIG. 3 which are identical to those shown in FIG. 1 are denoted by identical reference numerals, and will not be described in detail below.

The random pattern generator 20 generates a random pattern corresponding to the overhead of each frame of data. The selector 21 selects the data (payload) outputted from the reception interface 2 in the case of uninterrupted data switching, and selects the data of a random pattern from the random pattern generator 20 in the case of interrupted data switching. The selector 21 outputs the selected data to the parity generator 6 and the parity inserter 8. The counter 22 increments its count at the timing of a frame pulse outputted from the reception interface 1. The selector 23 selects the data outputted from the multiframe synchronizing circuit 4 in the case of uninterrupted data switching, and selects the data outputted from the counter 22 in the case of interrupted data switching. The selector 23 outputs the selected data to the address counter 16.

Operation of the transmission path switching apparatus shown in FIG. 3 in the case of uninterrupted data switching will be described below with reference to FIGS. 3 and 4A through 4D. Operation of the transmission path switching apparatus in the presence of uninterrupted data switching is the same as the operation of the conventional transmission path switching apparatus, and will not be described below.

Figure 4A:
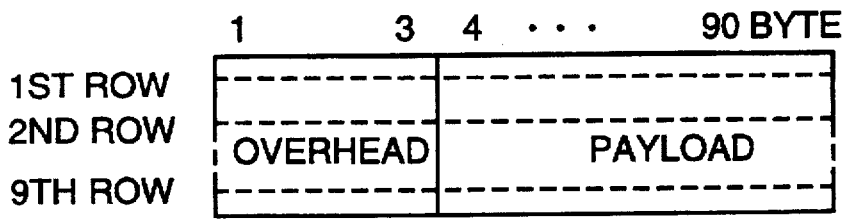
FIGS. 4A through 4D are diagrams showing a format of data inputted from a transmission path, an arrangement of one frame, and counts of address counters of the transmission path switching apparatus shown in FIG. 3.
Figure 4B:
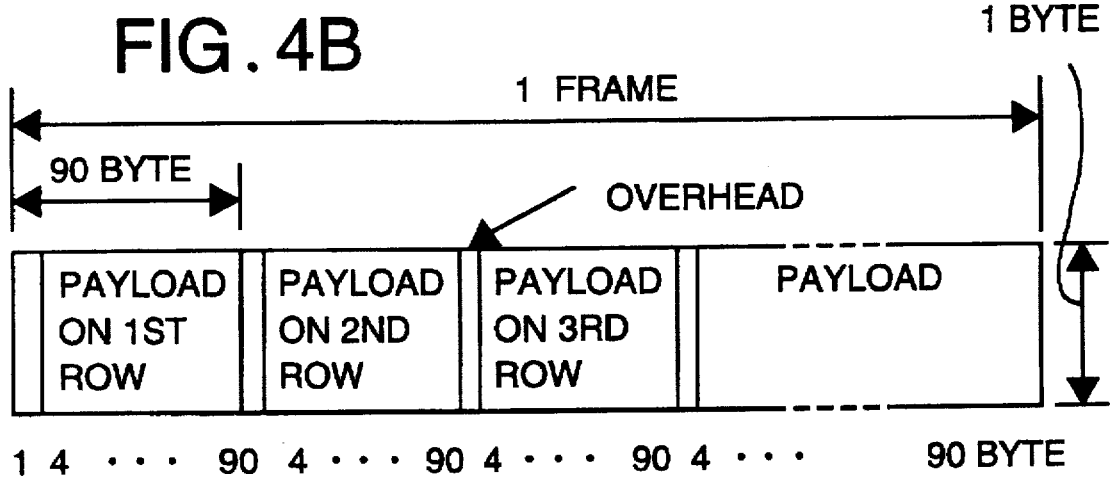
Figure 4C:
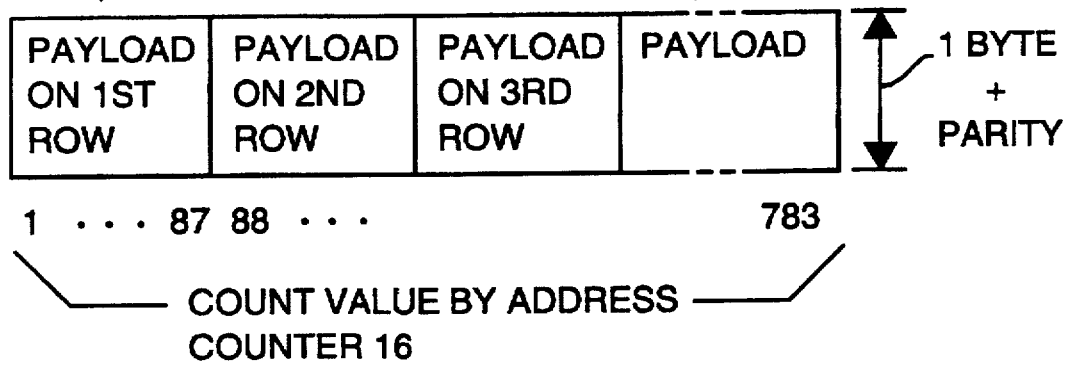

Data inputted from the transmission paths A, B have a format composed of 90 bytes (columns)×9 (rows) as shown in FIG. 4A. The data represented by 1 through 3 bytes in each row are an overhead which contains information representing operational management information and information indicative of the starting position of the data. The reception interface 1 connected to the transmission path A is supplied with data as shown in FIG. 4B. It is assumed that the reception interface 2 connected to the transmission path B is also supplied with similar data in the case of uninterrupted data switching, but may be supplied with undefined data in the case of interrupted data switching. The data from which the operational management information has been removed by the reception interface 1 are supplied to the multiframe synchronizing circuit 3, which extracts information indicative of the starting position of the data and generates a writing frame pulse.

Data to be written in the elastic memory 9 are subject to a parity check for each byte in order to detect any failure of the elastic memory 9. Therefore, the parity generator 5 carries out a parity check operation on data in each byte, and adds the result as a parity bit to the data to be written in the elastic memory 9. The data with a parity bit thus added thereto are then written into the elastic memory 9 at an address which is generated by the address counter 15. Inasmuch as the overheads in the data inputted from the transmission path A do not have information as substantive data, the address counter 15 controls the elastic memory 9 to inhibit the overheads from being written and put itself in a standby condition. The data of a payload written in the elastic memory 9 are read by a reading address generated from the frame pulse, and compared with the parity bit by the parity counter 11. The parity monitor unit 13 detects an error of the data based on the result of comparison from the parity counter 11.

Figure 4D:
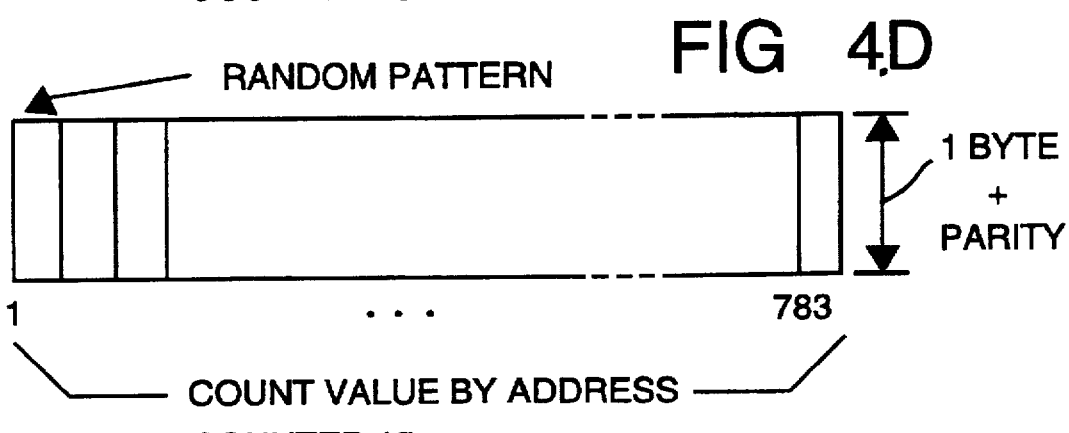

When data inputted from the transmission path B to the reception interface 2 are undefined, the random pattern generator 20 generates a random pattern as shown in FIG. 4D in order to effect a parity check with a high verification rate even if all bits of the data are 1s or 0s. For example, the random pattern generator 20 generates an alternate pattern of 0s and 1s, the parity generator 6 effects a parity check operation on the generated pattern, and the parity inserter 8 adds a parity bit and stores the data with the added parity bit in the elastic memory 10. Since the address counter 15 inhibits the overheads of the data inputted from the transmission path A from being written into the elastic memory 9, the counter 22 is operated during a period of time in which the address counter 15 inhibits the overheads from being written into the elastic memory 9, to control the address counter 16 to write the data of the random pattern in the elastic memory 10 that is associated with the transmission path B. During the other period of time, the elastic memory 10 is held in a standby condition.

As a result, the data as shown in FIG. 4D are written in the elastic memory 10. As with the data from the transmission path A, the parity counter 12 compares the data and the parity bit, and the parity monitor unit 14 detects an error of the data based on the result of comparison from the parity counter 12.

As described above, even if the data inputted from the transmission path B are undefined, the elastic memory 10 that is associated with the transmission path B is operated in timed relation to the frames in the data inputted from the transmission path A. While the overheads in the data inputted from the transmission path A are inhibited from being written into the elastic memory 9, the random pattern data are written into the elastic memory 10. Therefore, the amount of electric energy consumed by the two elastic memories 9, 10 in the transmission path switching apparatus according to the present invention is half the amount of electric energy consumed by the two elastic memories in the conventional transmission path switching apparatus.

Although a certain preferred embodiment of the present invention has been shown and described in detail, it should be understood that various changes and modifications may be made therein without departing from the scope of the appended claims.

What is claimed is:

1. A transmission path switching apparatus comprising:

first and second reception interface means for receiving multiframe data inputted respectively from first and second transmission paths and for outputting frame pulses each time the first and second reception interface means receive overheads in frames of the data;

first and second multiframe synchronizing means for detecting starting positions of the received data from positions of synchronizing patterns contained in the overheads of the data received by said first and second reception interface means;

random pattern generating means for generating a random pattern;

first selector means for selecting either a payload in the data received by said second reception interface means or the random pattern generated by said random pattern generating means;

first parity generating and inserting means for generating parity bits from a payload in the data received by said first reception interface means, and inserting the generated parity bits into said payload;

second parity generating and inserting means for generating parity bits respectively from a payload in the data received by said second reception interface means and an output signal from said first selector means, and inserting the generated parity bits respectively into said payload and said output signal;

first and second memories for storing output signals, respectively, from said first and second parity generating and inserting means;

counter means for incrementing a count in response to a frame pulse outputted from said first reception interface means;

second selector means for selecting either an output signal from said first multiframe synchronizing means or an output signal from said counter means;

first and second address generating means for generating writing addresses for said first and second memories based on respective output signals from said first and second multiframe synchronizing means, and generating reading addresses for said first and second memories in timed relation to said frame pulses;

parity monitor means for monitoring parity bits in data read from said first and second memories;

comparator means for comparing the data read from said first and second memories to determine whether the data read from said first and second memories agree with each other or not;

third selector means for selecting either the data read from said second memory instead of the data read from said first memory or the data read from said first memory instead of the data read from said second memory if the data read from said first and second memories do not agree with each other as determined by said comparator means; and transmission interface means for adding an overhead extracted by the first or second reception interface means to the data of a payload selected by said third selector means;

the arrangement being such that when said third selector means effects uninterrupted data switching, said first and second selector means select an output signal from said second reception interface and the output signal from said second multiframe synchronizing means, respectively, and when said third selector means does not effect uninterrupted data switching, said first and second selector means select said random pattern from said random pattern generating means and said output signal from said counter means, respectively.

2. A transmission path switching apparatus comprising:

first and second reception interfaces receiving multiframe data inputted respectively from first and second transmission paths and outputting frame pulses each time and the first and second reception interfaces receive overheads in frames of the data;

first and second multiframe synchronizing circuits detecting starting positions of the received data from positions of synchronizing patterns contained in the overheads of the data received by said first and second reception interfaces;

random pattern generator generating a random pattern;

first selector selecting either a payload in the data received by said second reception interface or the random pattern generated by said random pattern generator;

first parity generating and inserting device generating parity bits from a payload in the data received by said first reception interface, and inserting the generated parity bits into said payload;

second parity generating and inserting device generating parity bits respectively from a payload in the data received by said second reception interfaces and an output signal from said first selector, and inserting the generated parity bits respectively into said payload and said output signal;

first and second memories storing output signals, respectively, from said first and second parity generating and inserting devices;

counter incrementing a count in response to a frame pulse outputted from said first reception interfaces;

second selector selecting either an output signal from said first multiframe synchronizing circuit or an output signal from said counter;

first and second address generators generating writing addresses for said first and second memories based on respective output signals from said first and second multiframe synchronizing circuits, and generating reading addresses for said first and second memories in timed relation to said frame pulses;

parity monitor monitoring parity bits in data read from said first and second memories;

comparator comparing the data read from said first and second memories to determine whether the data read from said first and second memories agree with each other or not;

third selector selecting either the data read from said second memory instead of the data read from said first memory or the data read from said first memory instead of the data read from said second memory if the data read from said first and second memories do not agree with each other as determined by said comparator; and transmission interface for adding an overhead extracted by the first or second reception interface to the data of a payload selected by said third selector;

the arrangement being such that when said third selector effects uninterrupted data switching, said first and second selector select an output signal from said second reception interface and the output signal from said second multiframe synchronizing Circuit, respectively, and when said third selector does not effect uninterrupted data switching, said first and second selector select said random pattern from said random pattern generator and said output signal from said counter, respectively.

* * * * *